(12) United States Patent
Karpovich

(10) Patent No.: US 10,445,384 B2
(45) Date of Patent: Oct. 15, 2019

(54) SYSTEM AND METHOD FOR DETERMINING A SEARCH RESPONSE TO A RESEARCH QUERY

(71) Applicant: YANDEX EUROPE AG, Lucerne (CH)

(72) Inventor: Pavel Alekseevich Karpovich, Baranovichi (BY)

(73) Assignee: Yandex Europe AG, Lucerne (CH)

( * ) Notice: Subject to any disclaimer, the term of this patent is extended or adjusted under 35 U.S.C. 154(b) by 288 days.

(21) Appl. No.: 15/029,859

(22) PCT Filed: May 29, 2014

(86) PCT No.: PCT/IB2014/061824
§ 371 (c)(1),
(2) Date: Apr. 15, 2016

(87) PCT Pub. No.: WO2015/056112
PCT Pub. Date: Apr. 23, 2015

(65) Prior Publication Data
US 2016/0253424 A1    Sep. 1, 2016

(30) Foreign Application Priority Data

Oct. 16, 2013 (RU) ................................ 2013146655

(51) Int. Cl.
*G06F 16/9535* (2019.01)
*G06F 16/28* (2019.01)
(Continued)

(52) U.S. Cl.
CPC .... *G06F 16/9535* (2019.01); *G06F 16/24578* (2019.01); *G06F 16/284* (2019.01); *G06F 16/93* (2019.01); *G06F 16/9566* (2019.01)

(58) Field of Classification Search
CPC ......... G06F 17/30867; G06F 17/30011; G06F 17/3053; G06F 17/30595; G06F 17/30887
(Continued)

(56) References Cited

U.S. PATENT DOCUMENTS 7,062,485 B1   6/2006   Jin et al.
7,165,119 B2   1/2007   Fish
(Continued)

FOREIGN PATENT DOCUMENTS

EP           1222791 B1    7/2002
EP      20050000023 A2    9/2005
(Continued)

OTHER PUBLICATIONS

European Search Report from EP14854531, dated Oct. 14, 2016, Siodmok, Wojciech.
(Continued)

*Primary Examiner* — Hosain T Alam
*Assistant Examiner* — Nicholas E Allen
(74) *Attorney, Agent, or Firm* — BCF LLP

(57) ABSTRACT

There is provided a method for determining a search response to a search query associated with a user. The method may be executable at a server. The method comprises responsive to a receipt of the search query, determining the most relevant document to the search query; determining a likelihood parameter indicative of how likely the most relevant document is to satisfy the search query; in response to the likelihood being above a threshold, displaying exclusively the most relevant document; in response to the likelihood being below the threshold, displaying the general SERP including the most relevant document and other documents.

12 Claims, 6 Drawing Sheets

(51) Int. Cl.
*G06F 16/955* (2019.01)
*G06F 16/2457* (2019.01)
*G06F 16/93* (2019.01)

(58) Field of Classification Search
USPC .......................................................... 707/706
See application file for complete search history.

(56) References Cited

U.S. PATENT DOCUMENTS

| | | | |
|---|---|---|---|
| 7,287,012 B2 | 10/2007 | Corston et al. | |
| 7,512,615 B2 | 3/2009 | Bordawekar et al. | |
| 7,809,715 B2 | 10/2010 | Wei et al. | |
| 7,962,480 B1 | 6/2011 | Zhang et al. | |
| 8,051,076 B1* | 11/2011 | Garg | G06F 16/951 |
| | | | 707/723 |
| 8,255,541 B2 | 8/2012 | Reisman | |
| 8,346,764 B1 | 1/2013 | Rosenoff et al. | |
| 8,412,699 B1 | 4/2013 | Mukherjee et al. | |
| 8,452,753 B2 | 5/2013 | Szabo et al. | |
| 2003/0088553 A1 | 5/2003 | Monteverde | |
| 2004/0111388 A1 | 6/2004 | Boiscuvier et al. | |
| 2004/0260695 A1 | 12/2004 | Brill | |
| 2005/0149496 A1 | 7/2005 | Mukherjee et al. | |
| 2005/0154718 A1* | 7/2005 | Payne | G06F 7/00 |
| 2006/0041562 A1 | 2/2006 | Paczkowski et al. | |
| 2006/0122976 A1 | 6/2006 | Baluja et al. | |
| 2007/0266342 A1* | 11/2007 | Chang | G06F 17/30867 |
| | | | 715/810 |
| 2008/0059431 A1 | 3/2008 | Aoki et al. | |
| 2008/0133482 A1* | 6/2008 | Anick | G06F 17/30696 |
| 2009/0089312 A1* | 4/2009 | Chi | G06F 17/30867 |
| 2010/0008883 A1 | 1/2010 | Alwattari | |
| 2010/0094868 A1* | 4/2010 | Leung | G06F 17/30861 |
| | | | 707/726 |
| 2010/0101183 A1 | 4/2010 | Beisel | |
| 2010/0318507 A1* | 12/2010 | Grant | G06F 17/30864 |
| | | | 707/706 |
| 2011/0029513 A1 | 2/2011 | Morris | |
| 2011/0029517 A1 | 2/2011 | Ji et al. | |
| 2011/0040752 A1 | 2/2011 | Svore et al. | |
| 2011/0078049 A1* | 3/2011 | Rehman | G06Q 10/10 |
| | | | 705/27.1 |
| 2011/0119302 A1* | 5/2011 | Gorman | G06F 17/2705 |
| | | | 707/771 |
| 2011/0213655 A1 | 9/2011 | Henkin et al. | |
| 2011/0264673 A1* | 10/2011 | White | G06F 16/9535 |
| | | | 707/750 |
| 2012/0166973 A1* | 6/2012 | Gurevich | G06F 17/30864 |
| | | | 715/760 |
| 2012/0203690 A1 | 8/2012 | Yang et al. | |
| 2012/0323880 A9 | 12/2012 | Al-Kofahi et al. | |
| 2012/0323898 A1* | 12/2012 | Kumar | G06Q 30/0251 |
| | | | 707/723 |
| 2012/0330941 A1 | 12/2012 | Liu | |
| 2013/0013580 A1* | 1/2013 | Geller | G06F 17/30672 |
| | | | 707/706 |
| 2013/0031032 A1 | 1/2013 | Mehta et al. | |
| 2013/0067364 A1* | 3/2013 | Berntson | G06F 3/048 |
| | | | 715/764 |
| 2013/0191360 A1* | 7/2013 | Burkard | G06F 17/30902 |
| | | | 707/706 |

FOREIGN PATENT DOCUMENTS

| | | |
|---|---|---|
| EP | 1673703 A1 | 6/2006 |
| EP | 2312467 A1 | 4/2011 |
| RU | 2393537 C2 | 6/2010 |
| WO | 1999019816 A1 | 4/1999 |
| WO | 2000043911 A1 | 7/2000 |
| WO | 2000074335 A2 | 12/2000 |
| WO | 2001046870 A1 | 6/2001 |
| WO | 2005031600 A2 | 4/2005 |
| WO | 2007140685 A1 | 12/2007 |
| WO | 2008061133 A1 | 5/2008 |

OTHER PUBLICATIONS

International Search report from PCT/IB2014/061824, dated Dec. 24, 2014, Blaine R. Copenheaver.
I'm Feeling Lucky Google Button—How to Use the I'm Feeling Lucky Google Button, http://google.about.com/video/Im-Feeling-Lucky-Google-Button.htm; Retrived on Apr. 6, 2016.

* cited by examiner

SYSTEM AND METHOD FOR DETERMINING A SEARCH RESPONSE TO A RESEARCH QUERY

CROSS-REFERENCE

The present application claims convention priority to Russian Utility Model Application No. 2013146655, filed on Oct. 16, 2013, entitled "СИСТЕМА И СПОСОБ ОПРЕДЕЛЕНИЯ ПОИСКОВОЙ ВЫДАЧИ НА ПОИСКОВЫЙ ЗАПРОС". This application is incorporated by reference herein in its entirety.

FIELD

The present technology relates to search engines in general and specifically to a system and method for determining a search response to a search query.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user may access a resource on the communications network by two principle means. The given user may access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

For example, the given user may be interested in viewing pictures of Britney Spears, but may not be aware of a particular resource that would present such information. Alternatively, the given user may be interested in locating the closest Starbucks coffee shop, but again may not be aware of a particular web resource to provide such location services. In these fictitious (yet practical) circumstances, the given user may run a web search using a search engine.

When the given user runs a web search using the search engine, she generally has two priorities. She wants the search engine to locate the most relevant results and she wants the results relatively fast.

SUMMARY

It is an object of the present technology to ameliorate at least some of the inconveniences present in the prior art.

According to a first broad aspect of the present technology, there is provided a method for determining a search response to a search query associated with a user. The method may be executable at a server. The method comprises responsive to a receipt of the search query, determining the most relevant document to the search query; determining a likelihood parameter indicative of how likely the most relevant document is to satisfy the search query; in response to the likelihood being above a threshold, displaying exclusively the most relevant document; in response to the likelihood being below the threshold, displaying the general SERP including the most relevant document and other documents.

According to a second broad aspect of the present technology, there is provided a server for determining a search response to a search query associated with a user. The server comprises a non-transient computer usable information storage medium storing computer instructions, which instructions when executed, cause the server to execute steps of: responsive to a receipt of the search query, determining the most relevant document to the search query; determining a likelihood parameter indicative of how likely the most relevant document is to satisfy the search query; in response to the likelihood being above a threshold, displaying exclusively the most relevant document; in response to the likelihood being below the threshold, displaying the general SERP including the most relevant document and other documents.

According to another broad aspect of the present technology, there is provided an electronic device comprising a non-transient computer usable information storage medium storing computer instructions. These instructions when executed, cause the electronic device to execute steps of: receiving a search query from a user and transmitting the search query to a server, via a communication network; receiving from the server a trigger. The trigger has been generated by the server by executing the steps of: responsive to a receipt of the search query, determining by the server the most relevant document to the search query; determining by the server a likelihood parameter indicative of how likely the most relevant document is to satisfy the search query. The trigger being instrumental in causing the electronic device: in response to the likelihood being above a threshold, displaying exclusively the most relevant document; in response to the likelihood being below the threshold, displaying the general SERP including the most relevant document and other documents.

In some implementations of the present technology, the server further ranks search results into a ranked search results or receives the ranked search results (for example, from a search cluster).

In some implementations of the present technology, to determine the most relevant document, the server selects a top result in the ranked search results.

In other implementations, to determine the most relevant document, the server compares a top result in the ranked search results with the remainder of the ranked search results. The comparison of the top result may comprise calculating a relevancy differential between the top document and the remainder of the documents within the ranked search results set. Based on the comparison, the server may deduce that the top result is the most relevant document if the relevancy differential is above a predetermined threshold.

In some implementations of the present technology, to compare the top result, the server compares the top result in the ranked search results with a sub set of search results following the top result within the ranked search results. The comparison of the top result may comprise calculating a relevancy differential between the top document and the sub set of search results following the top result within the ranked search results. Based on the comparison, he server may deduce that the top result is the most relevant document if the relevancy differential is above a predetermined threshold.

In some implementations of the present technology, the server may execute the step of determining a likelihood parameter only in response to the relevancy differential being above the pre-determined threshold. In other implementations of the present technology, responsive to the relevancy differential being below the pre-determined threshold, the server automatically displays general SERP including the most relevant document and other documents.

In some implementations of the present technology, to determine a likelihood parameter, the server analyzes a title field associated with the most relevant document. The analyzing may include comparing the title field with the search query.

In some implementations of the present technology, to determine a likelihood parameter, the server analyzes a universal resource locator (URL) associated with the most relevant document. The analyzing may include comparing the URL associated with the most relevant document with the search query or comparing the URL of a top domain hosting the most relevant document.

In some implementations of the present technology, to determine a likelihood parameter, the server analyzes a clickability parameter associated with the most relevant document.

In some implementations of the present technology, to determine a likelihood parameter, the server analyzes at least one of: a title field associated with the most relevant document; a universal resource locator (URL) associated with the most relevant document; a clickability parameter associated with the most relevant document. In some aspects of the present technology, the server executes all three analyzing steps.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
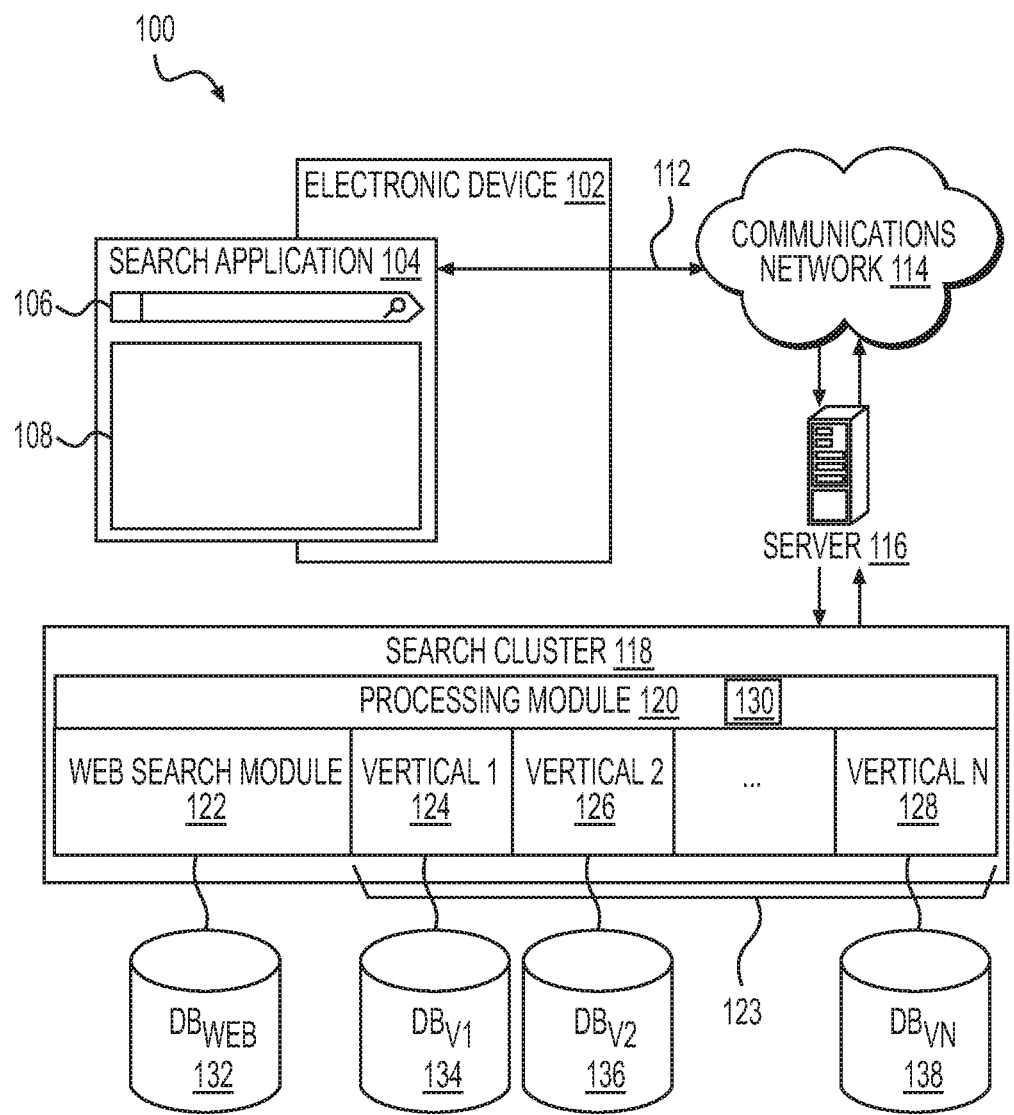
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, may sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may be embodied in a user accessing a web site associated with a search engine to access the search application 104. For example, the search application may be accessed by typing in an URL associated with Yandex™ search engine at www.yandex.ru. It should be expressly understood that the search application 104 may be accessed using any other commercially available or proprietary search engine.

In alternative non-limiting embodiments of the present technology, the search application 104 may be implemented as a browser application on a portable device (such as a wireless communication device). For example (but not limited to) in those implementations, where the electronic device 102 is implemented as a portable device, such as for example, Samsung™ Galaxy™ SIII, the electronic device may be executing a Yandex™ browser application. It should be expressly understood that any other commercially available or proprietary browser application may be used for implementing non-limiting embodiments of the present technology.

Generally, speaking, the search application 104 comprises a query interface 106 and a search result interface 108. The general purpose of the query interface 106 is to enable the user (not depicted) to enter her query or a "search string". The general purpose of the search result interface 108 is to provide search results that are responsive to the user query entered into the query interface 106. How the user query is processed and how the search results are presented will be described in detail herein below.

The electronic device 102 is coupled to a communications network 114 via a communication link 112. In some non-limiting embodiments of the present technology, the communications network 114 may be implemented as the Internet. In other embodiments of the present technology, the communications network 114 may be implemented differently, such as any wide-area communications network, local-area communications network, a private communications network and the like.

How the communication link 112 is implemented is not particularly limited and will depend on how the communication device 102 is implemented. Merely as an example and not as a limitation, in those embodiments of the present technology where the electronic device 102 is implemented as a wireless communication device (such as a smart-phone), the communicated link 102 may be implemented as a wireless communication link (such as but not limited to, a 3G communications network link, a 4G communications network link, a Wireless Fidelity, or WiFi® for short, Bluetooth® and the like). In those examples, where the communication device 102 is implemented as a notebook computer, the communication link may be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementational details for the electronic device 102, the communication link 112 and the communications network 114. As such, by no means, examples provided herein above are meant to limit the scope of the present technology.

Also coupled to the communications network is a server 116. The server 116 may be implemented as a conventional computer server. In an example of an embodiment of the present technology, the server 116 may be implemented as a Dell™ PowerEdge™ Server running the Microsoft™ Windows Server™ operating system. Needless to say, the server 116 may be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

The server 116 is communicatively coupled (or otherwise has access) to a search cluster 118. The general purpose of the search cluster 118 is to perform searches in response to the user queries inputted via the query interface 106 and to output search results to be presented to the user using the search results interface 108. What follows is a description of one non-limiting embodiment of the implementation for the search cluster 118. However, it should be understood that there is a number of alternative non-limiting implementations of the search cluster 118 possible. It should be also expressly understood that in order to simplify the description presented herein below, the configuration of the search cluster 118 has been greatly simplified. It is believed that those skilled in the art will be able to appreciate implementational details for the search cluster 118 and for components thereof that may have been omitted for the purposes of simplification of the description.

Generally speaking the purpose of the search cluster 118 is to (i) conduct searches (details will be explained herein below); (ii) execute analysis of search results and perform ranking of search results; (iii) group results and compile the search result page (SERP) to be outputted to the electronic device 102. How the search cluster 118 is configured to execute searches is not particularly limited. Those skilled in the art will appreciate several ways and means to execute the search using the search cluster 118 and as such, several structural components of the search cluster 118 will only be described at a high level.

In some non-limiting embodiments of the present technology, the search cluster 118 comprises a processing module 120. The processing module 120 may execute several searches, including but not limited to, a general search and a vertical search. To that end, the processing module 120 comprises (or has access to) a web search module 122. The web search module 122 is configured to perform general web searches, as is known to those of skill in the art.

In some non-limiting embodiments of the present technology, processing module 120 may execute what is known as a multi-level meta search. These non-limiting embodiments may be implemented, for example, to increase the speed of the search and to obtain more relevant search results. In some non-limiting embodiments of the present technology, the web search module 122 may be responsible for executing the multi-level meta search.

To that end, the web search module 122 may execute the top level meta search, as will be discussed in greater detail herein below. The web search module 122 may also have access to a database $DB_{WEB}$ 132, which database $DB_{WEB}$ 132 may be accessed by the web search module 122 to conduct a middle level meta search and a bottom level meta search. Even though the database $DB_{WEB}$ 132 is depicted as a single entity, in some non-limiting embodiments of the present technology, the database $DB_{WEB}$ 132 may be implemented in a distributed manner, for example as a dedicated database for each of the middle level meta search and the bottom level meta search.

Also, even though the web search module 122 is depicted as a single entity, in alternative non-limiting embodiments of the present technology the web search module 122 may also be implemented in a distributed manner. For example, each of the distributed implementations of the web search modules 122 may be dedicated to search queries originating from a particular geographical region. In those non-limiting embodiments of the present technology, the processing module 120 may determine a location and/or an IP address associated with the electronic device 102 associated with the user who is submitting the search query. Based on the so-determined location and/or the IP address of the electronic device 102, the processing module 120 may forward the search query to one of the distributed web search modules 122 to perform the top level meta search.

The web search module 122 may also forward a request to the database $DB_{WEB}$ 132 to perform the middle level meta search and the bottom level meta search. In some non-limiting embodiments of the present technology, the database $DB_{WEB}$ 132 may have a portion (or a separate database) dedicated to the middle level meta search (for example, having a repository of frequently asked questions). The identification of the portion (or a separate database) of the database $DB_{WEB}$ 132 responsible for the middle level meta search may be executed by the database $DB_{WEB}$ 132 based on a so-called "CRC-code". The portion (or a separate database) of the database $DB_{WEB}$ 132 responsible for the middle level meta search may send a given generated query to a portion (or a separate database) of the database $DB_{WEB}$ 132 responsible for the bottom level meta search.

However, in some non-limiting embodiments of the present technology, where the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level meta search may be omitted altogether. Naturally, in alternative embodiments of the present technology, even if the search query is already saved in cache of the portion (or the separate server) of the database $DB_{WEB}$ 132 as part of the middle level meta search, the step of transmitting the query to the portion (or the separate database) of the database $DB_{WEB}$ 132 responsible for the bottom level meta search may still be performed.

The processing module 120 further comprises (or has access to) a plurality of vertical search modules 123. In the depicted non-limiting embodiment, the plurality of vertical search modules includes a vertical 1 module 124, a vertical 2 module 126 and a vertical N module 128. It should be expressly understood that the number of modules within the plurality of vertical search modules 123 is not meant to be a limitation of embodiments of the present technology.

Merely for the purposes of ease of illustration, it shall be assumed that the vertical 1 module 124 is implemented as a vertical search domain for searching maps and other geographical information. As such, it may be said that the vertical 1 module 124 implements a map vertical search engine or, simply, a map service.

Furthermore, it shall be assumed that the vertical 2 module 126 is implemented as a vertical search module for searching images. As such, it may be said that the vertical 2 module 126 implements an images vertical search domain or, simply, an image service. For the various examples to be provided herein below, it shall be assumed, selectively, that the vertical N search module 128 may implement one of sports news, movies, and weather, translation, wiki or movie theater services. It should be expressly understood that a number of additional or different services may be implemented as part of the plurality of vertical search modules 123.

In some non-limiting embodiments of the present technology, any given one of the plurality of vertical search modules 123 comprises or has access to one or more databases. These one or more databases host data associated with the particular service implemented by the given one of the plurality of vertical search modules 123.

To that extent, the vertical 1 module 124 has access to a database $DB_{V1}$ 134. Recalling that the vertical 1 module 124 implements a map service, the database $DB_{V1}$ 134 contains information related to geographical location of various objects and the associated maps. The vertical 2 module 126 has access to a database $DB_{V2}$ 136. Recalling that the vertical 2 module 126 implements an image service, the database $DB_{V2}$ 136 may host a repository of various images. By the same token, the vertical N module 128 has access to a database $DB_{VN}$ 138. Recalling that the vertical N module 128 implements selectively one of sports news, movies, weather, translation or movie theater services, the database $DB_{VN}$ 138 may host a repository of data associated with the respective selective service.

Additionally or optionally and, as known to those skilled in the art, the one or more databases (such as the database $DB_{V1}$ 134, $DB_{V2}$ 136 and $DB_{VN}$ 138) may be segregated into one or more separate databases. These segregated databases may be portions of the same physical database (such as the database $DB_{V1}$ 134, database $DB_{V2}$ 136 and database $DB_{VN}$ 138) or may be implemented as separate physical entities. For example, one database within, let's say, the database $DB_{V2}$ 136 could host the most popular/most frequently requested images in a given category, while another database within the database $DB_{V2}$ 136 could host all the images available within the image service. Needless to say, the above has been provided as an illustration only and several additional possibilities exist for implementing embodiments of the present technology.

Furthermore, it is possible that some of the plurality of vertical search modules 123 may not implement a separate database. This is particularly true, but is not limited to, for example, the vertical N module 128 implementing a weather service. In this example, the vertical N module 128 implementing the weather service may not have a dedicated database, but may rather have access to a service widget repository 130. The service widget repository 130 may be implemented as data repository for one or more widget applications, as will be described in greater detail here below.

Each of the plurality of vertical search modules 123 is configured to perform vertical searches within the respective databases (i.e. database $DB_{V1}$ 134, database $DB_{V2}$ 136 and database $DB_{VN}$ 138). However, it should be noted that the search capabilities of the plurality of vertical search modules 123 are not limited to searching the respective databases (i.e. database $DB_{V1}$ 134, database $DB_{V2}$ 136 and database $DB_{VN}$ 138). As such, the plurality of vertical search modules 123 may perform other searches, as the need may be.

Also, for the purposes of the description presented herein, the term "vertical" (as in vertical search or in vertical search domain) is meant to connote a search performed on a subset of a larger set of data, the subset having been grouped pursuant to an attribute of data. For example, to the extent that the vertical 2 module 126 implements an image service, the vertical 2 module 126 searches a subset (i.e. images) of the set of data (i.e. all the data potentially available for searching), the subset of data being stored in the database $DB_{V2}$ 136.

In some non-limiting embodiments of the present technology, some or all of the search results returned by a respective one of the vertical search modules 123 may be formatted into a widget application. In a sense, the widget application is a particular way to represent the search results from a given vertical search of one of the plurality of vertical search modules 123.

Merely for the purposes of simplifying the description to be presented herein, only a high level description of one approach to executing a search by the search cluster 118 will be presented herein below. It is expected that those skilled in the art will be able to configure the search cluster 118 in any number of known ways without undue experimentation or burden.

As has been mentioned above, in some non-limiting embodiments of the present technology, the processing module 120 may be configured to execute a search in a multi-level meta fashion. In some non-limiting embodiments of the present technology, the processing module 120 includes an http-interface (not depicted) for receiving the search request from the server 116.

When the processing module 120 receives the search query from the server 116, it sends the search query to the web search module 122. As has been alluded to above, in some non-limiting embodiments of the present technology, the sending of the search request to the web search module 122 may be based on the location and/or IP address associated with the electronic device 102, as may be determined by the processing module 120. The web search module 122 performs a search, which in some non-limiting embodiments of the present technology may include a multi-level meta search. To that extent, the web search module 122 executes some or all of the top level meta search, middle level middle search and the bottom level meta search.

In parallel or in sequence, the processing module 120 also transmits the search query to the plurality of vertical search modules 123 for performing the respective vertical searches. The responses from all the search sources (the plurality of vertical search modules 123 and the web search module 122, which may include the bottom level meta search, the middle level meta search and the top level meta search) are received and amalgamated by the processing module 120.

The processing module 120 then executes a ranking function to generate a ranked search results set. In other words, the processing module 120 ranks the search results by their relevancy to the search query submitted by the user. As those skilled in the art will appreciate, relevancy within this description shall mean how responsive a given search result is to the user query.

Those skilled in the art will appreciate various techniques available for ranking search results. Just as an example and not as a limitation, some of the known techniques for ranking search results by relevancy are based on some or all of: (i) how popular a given search query or a response thereto is in either the plurality of vertical search modules 123 or in the bottom level search (or any other level of the multi level meta search); (ii) how many results have been returned by either the plurality of vertical search modules 123 or in the bottom level search (or any other level of the multi level meta search); (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the standard SERP.

Within this description, the term "determinative term" shall mean a word or a string of words indicative of the fact that a given search result is more likely to have the most relevant response to the user search query. For example, if the search query contains the term "images" it may be determined, by the processing unit 120, that the vertical 2 module 126, being implemented as an image service, is likely to be the service that contains the most relevant results to the user query. Needless to say, only a sub set of these, or these combined to others or any combination of other factors my be taken into account when raking the search results for relevancy.

The search cluster 118 is then configured to transmit ranked search results to the server 116.

In accordance with non-limiting embodiments of the present technology, the server 116 receives the ranked search results from the search cluster 118 and determines the "best document" in response to the search query. The best document also referred to herein from time to time as "the most relevant document". For the purposes of the description to be presented herein below, the term "best document" denotes a type of a document out of the ranked search results received by the server 116 from the search cluster 118 (which may be a web page, a portion of the web page, an image, a file or any other type of specific content) that is the most responsive to the search query. Also, in accordance with embodiments of the present technology, the best document is considered to be the most responsive to the user query and, hence, it is deemed that by getting access to the best document, the user is likely to satisfy whatever problem or goal the user was pursuing when submitting the search query.

In some embodiments of the present technology, the server 116 determines that a resource associated with the top search result (or "top document" for short) in the ranked search results is the best document. In other embodiments of the present technology, for example where the top result is a widget application, the server 116 may determine that the best document is the resource associated with the search result following the widget application in the ranked search results.

In yet additional embodiments of the present technology, in order to determine if the top document is the best document, the server 116 determines a relevancy factor differential by comparing a relevancy factor associated with the top document with a relevancy factor associated with the other search results returned in the ranked search results.

In some embodiments, the server 116 may compare the relevancy factor associated with the top document with a relevancy factor associated with the next search result down from the top document in the ranked search results. Within these embodiments, if the server 116 determines that the relevancy factor associated with the top document is higher than the next search result down, the server 116 may determine that the top document is indeed the best document.

In other embodiments, the server 116 may compare the relevancy factor associated with the top documents with each of the top five search results following the top document. In those embodiments, the server 116 may determine that the top document is indeed the best document if the relevancy factor associated with the top document is higher than the relevancy factor associated with three out of five top search results following the top document.

In other embodiments, the server 116 may compare the relevancy factor associated with the top document with an average (or a mean) of the top five search results following the top document. In those embodiments, the server 116 may determine that the top document is indeed the best document if the relevancy factor associated with the top document is higher than the average (or the mean) of the five top search results following the top document.

In some embodiments, rather than comparing absolute values of the relevancy factors, the server 116 may look at the delta between the relevancy factor associated with the top document and the relevancy factor of the next search result down in the ranked search results. For example, if the absolute difference is 10 percentage points (or higher), the server 116 may determine that the top document is indeed the best document. Naturally, in the example above, the 10 percentage points is used as an example only. Any other value, selected by the operator of the server 116, may be used.

It should be understood that for the purposes of this description, the term "relevancy factor" is a value assigned to the search results within the ranked search results by the search cluster 118. Within some implementations of this technology, the assigned relevancy factor is expressed as a percentage between zero and one hundred (the higher the percentage, the higher the relevancy, for example). This is what has been used in the examples above. In alternative embodiments, the relevancy factor may be implemented as a different form factor, such as on a scale on one to ten, on a scale from A to Z and the like.

It should be noted that within the embodiments discussed above, an operator of the server 116 may pre-determine how substantially different the relevancy factor between the top document and the remainder of comparative items need to be for the server 116 to determine that the top document is indeed the best document.

If the sever 116 determines that the relevancy factor of the top document is substantially different from the remainder of the search results (i.e. that the top document is indeed the best document, as has been described at length above), the server 116 is further configured to determine a likelihood parameter that the user performing the search is desirous of seeing exclusively the best document. In additional non-limiting embodiments of the present technology, the determination of the likelihood parameter may be executed without first determining if the top document is indeed the best document. For example, it may be assumed, as has been described above, that the top document in the ranked search results list is indeed the best document and the determination of the likelihood parameter can be executed automatically using the top document as the best document.

For the purposes of embodiments of the present technology, it is assumed that the user is desirous of seeing exclusively the best document if the likelihood parameter associated with the best document is above a certain threshold, indicative of the fact that the best document is the most responsive to the user query. Generally speaking, the more responsive the best document to the search query, the higher the likelihood parameter is. The logic behind this relationship is that if the best document is most responsive to the user search query—the user only needs to see that best document to satisfy her search needs expressed through the search query. Thus seeing exclusively the best document will address whatever problem, need or goal the user had when initiating the search query.

In some embodiments of the present technology, to determine the likelihood parameter, the server 116 analyzes the best document. There are several algorithms possible for determining the likelihood parameter. What follows is the description of some of the approaches that may be taken to determine the likelihood parameter. Those of skill in the art should appreciate that these algorithms may be inter-combined, some of these described algorithms may be omitted, while others may be mixed with other approaches.

In some embodiments of the present technology, the likelihood parameter may be binary, such as "0" or "1", "low" or "high" and the like. In alternative embodiments of the present technology, the likelihood parameter may be assigned on a sliding scale, such as "0" to "10", "low—medium—high" and the like.

In some embodiments, the server 116 may analyze information associated with the best document to determine the likelihood parameter. In some embodiments, the information associated with the best document is the title of the best document. In alternative embodiments, information associated with the best document is a snippet compiled for the best document by the search cluster 118 as part of generating the ranked search results.

In some embodiments, the server 116 analyzes information associated with the best document to check if a certain number of terms from the search query are present within the information associated with the best document. For example, the server 116 may check if three terms (provided that there are more than three terms available) of the search query are present within the information associated with the best document. In alternative embodiments, the server 116 may use a different number of terms in this analysis process.

If the server 116 determines that the information associated with the best document contains the pre-determined number of terms from the search query, the server 116 may assign a higher likelihood parameter to the best document. Where this analysis is performed in addition to the other types of analysis described below, the server 116 may augment the assigned likelihood parameter based on the analysis of the information associated with the best document (i.e. increase or decrease the likelihood parameter assigned based on the other types of analysis).

Just as an illustration, it shall be assumed that the user has submitted a search query containing "VISA card special deal". It shall be further assumed that the top search results contains a web page hosted on a web site www.visacard-dealsforyou.com, the title of the web page being "VISA cards deals (monthly)" and the description (or snippet) of the web page is: "This page provides a monthly special deal for VISA cardholders from some of the leading brands". Within this example, the server 116 may determine that the three terms of the search query "VISA", "card" and "deal" are present in the snippet of information associated with the best document and, hence, assign a higher likelihood parameter.

In some embodiments, additionally or alternatively, the server 116 may analyze an address associated with the best document. For example, the server 116 may analyze the Universal Resource Locator (URL) associated with the best document. In some embodiments, the server 116 checks if the URL contains a discrete word from within the search query.

In alternative embodiments, the server 116 checks if the URL contains certain number of letters from the words of the search query. For example, the server 116 may check if three consecutive letters from a word of the search query are present within the URL. It should be understood that the server 116 may check any other number of letters (consecutive or not) from the search query to assign or augment the likelihood parameter. Continuing with the above example, the server 116 may analyze if any of the following three-letter elements are present within the URL: "VIS", "ISA", "ARD", "DEA" and the like.

In some embodiments, if the server 116 determines that the word (or the letters, as the specific case may be) are present in the URL, the server 116 may assign a higher likelihood parameter or augment to increase the previously assigned likelihood parameter (i.e. the likelihood parameter assigned based on the other types of analysis described above or below). Continuing with the above example, the server 116 may determine that three words "VISA", "card" and "deal" from the search query are present in the URL associated with the best document and, hence, assign a higher likelihood parameter.

In some embodiments, additionally or alternatively, the server 116 analyzes clickability statistics associated with the best document. For the avoidance of doubt, the term "clickability analysis" is meant to denote an analysis of how often other users executing the same (or similar) query have clicked onto the best document within the ranked search results (whether or not the best document had the same position within ranked search results presented in prior searches is not necessarily relevant for this analysis). The clickability statistics may be stored in an internal database (not depicted) of the server 116 or bay be available from an external source (such as, for example, the search cluster 118 or the like).

In some embodiments, the server 116 analyzes the specific URL associated with the best document. In alternative embodiments, the server 116 analyzes the URL associated with the top domain hosting the best document. This may be particularly useful in (but not limited to) those executions where the content of the best document changes over time (i.e. where the content is dynamic). For instance, let's say the best document contains a news result, for example, top news section of a news portal. By analyzing the clickability of the top domain (i.e. the news portal overall) rather than the specific news segment may provide a more consistent result when determining the likelihood parameter.

In some embodiments of the present technology, the server 116 may utilize all (or some) of the above algorithms to assign the likelihood parameter. For example, in some embodiments of the present technology, the server 116 may analyze the best document for (i) analysis of the information associated with the best document, (ii) analysis of the URL of the best document and (iii) the clickability analysis.

In other embodiments of the present technology, the server 116 may analyze a sub-set of factors listed in (i) through (iii) immediately above. In yet further non-limiting embodiments of the present technology, the server 116 may analyze the factors (or a subset of factors) listed in (i) through (iii) in the paragraph preceding immediately above with a number of additional factors, which additional factors will become apparent to those skilled in the art having access and appreciation of the teachings of the present description.

In other embodiments of the present technology, the server 116 may use the factors listed in (i) to (iii) above in a sequence (in any given order), where likelihood parameters is modified based on the sequential analysis of the factors listed in (i) to (iii) above.

Once the server 116 determines the likelihood parameter, as has been described above, the server 116 then may compare the so-determined likelihood parameter with a pre-determined threshold. The pre-determined threshold may be established by an operator of the server 116.

If the determined likelihood parameter is above the pre-determined threshold, the server 116 may cause the best document to be exclusively displayed to the user. In other words, if the server 116 determines that the likelihood parameter is above the pre-determined threshold, the user will only see the best document, as the result to his or her search query.

If, on the other hand, the determined likelihood parameter is below the pre-determined threshold, the server 116 may cause the display of a search results page (SERP), as is generally known in the art.

Now, how the pre-determine threshold is established is not particularly limiting. In some embodiments of the present technology, an operator associated with the server 116 established the pre-determined parameter based on a trial-and-error method. In alternative embodiments, the operator of the server 116 may establish the pre-determined parameter based on focus groups or executing a number of searches associated with the focus group. Naturally, the operator of the server 116 may amend the pre-determined threshold from time to time, based on the user feedback or based on any other factors. Needless to say that the pre-determined threshold may be amended from time to time by the operator of the server 116.

It should be readily apparent that the pre-determined threshold and the likelihood parameter are expressed in the same form factor. For example, where the likelihood parameter is expressed binary as either "0" or "1", the threshold may be expressed as "1". In those embodiments, where the likelihood parameter is expressed as "low" or "high", the threshold may be established as "high". Yet in additional embodiments, where the likelihood parameter is expressed as a sliding scale (for example, "0" to "10"), the threshold may be established at 5 (or above) or 6 (or above) or any other suitable value within the sliding scale. However, if it happens that the pre-determined threshold and the likelihood parameter are not expressed in he same form factor, the server 116 can implement a translation algorithm to correlate the form factor of one to the form factor of the other.

In alternative non-limiting embodiments of the present technology, rather than having a single pre-determined threshold, the server 116 may assign a dedicated pre-determined threshold to each of the algorithms used for determining the likelihood parameter. Within those embodiments, the server 116 may then use an aggregate of the three (or whatever the number of algorithms was used) outcomes of the algorithms (for example two out of three), an average value of the outcomes or a weighted aggregate of the outcomes.

Responsive to the determination that the likelihood parameter is above the pre-determined threshold, the server 116 may then assign the top document a "best document" attribute, which may be assigned in a dedicated (custom) field or any other field. The best document attribute, for example, may cause the communication device 102 to, instead of displaying the SERP, to request, receive and display the resource associated with the best document attribute.

It should be noted that the above described architecture of system 100 of FIG. 1 has been depicted as an example only. Other non-limiting embodiments for the architecture of FIG. 1 are possible and will become apparent to those of skill in the art having benefit of the present disclosure. For example, the plurality of vertical search modules 123 may be accessed by the server 116 independently from the search cluster 118 and, therefore, may be located on a server other than the search cluster 118.

Given the architecture described with reference to FIG. 1, it is possible to execute a method of conducting a search and presenting search results. The method of conducting the search and presenting search results may be conveniently executed on the server 116 of FIG. 1. To that end, the server 116 includes a non-transient computer usable information storage medium storing computer instructions, which instructions when executed, cause the server 116 to execute steps of the method described herein below.

Figure 2:
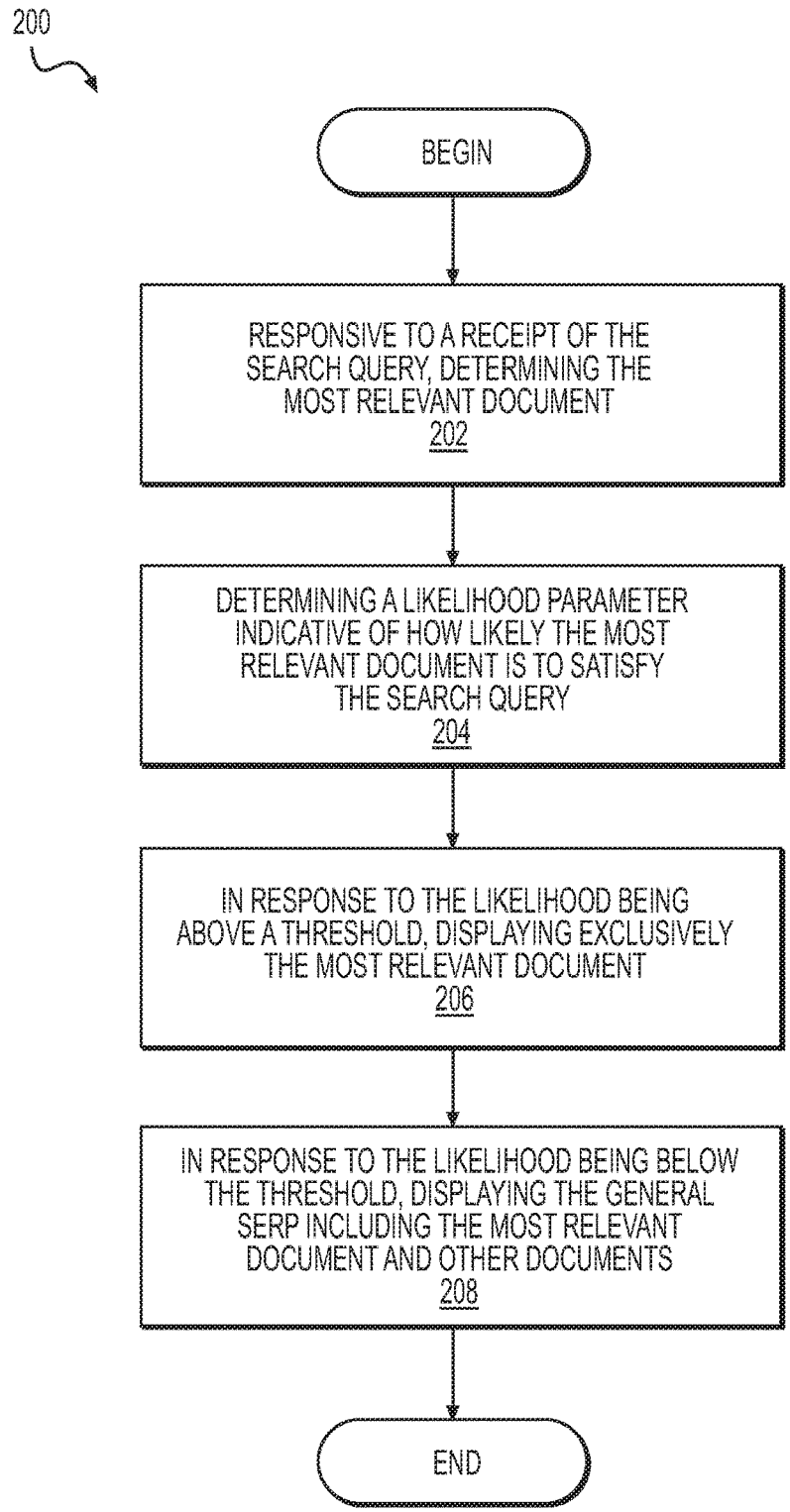
FIG. 2 is a block diagram depicting a method 200, the method 200 being implemented within the system 100 of FIG. 1 and being implemented according with non-limiting embodiments of the present technology.

Reference will now be made to FIG. 2, which depicts a block diagram of a method 200, the method 200 being implemented in accordance with a non-limiting embodiment of the present technology. It should be noted that in some embodiments of the present technology, method 200 is executed without any affirmative actions of the user (in other words, method 200 may be executed automatically). In alternative non-limiting embodiments, the user may "activate" a feature indicative of the user desire to have the method 200 executed automatically (for example, by checking an appropriate box in the settings or the like). The method 200 is executed, by the server 116, in response to receipt of the search query from a user. As is generally known, where the server 116 receives the search query, it performs a search and ranks the search results into ranked search results, as has been described at length above.

Step 202—Responsive to a Receipt of the Search Query, Determining the Most Relevant Document The method 200 begins at step 202, where the server 116, in response to the receipt of the search query, determines the most relevant document (i.e. the "best document" as has been described above). In some embodiments of the present technology, the server 116 determines that the top search result in the ranked search results is the best document.

In alternative embodiments of the present technology, for example where the top result is a widget application, the server 116 may determine that the best document is the document following the widget application in the ranked search results. In yet additional non-limiting embodiments, of the server 116 determines that that the top result is a widget application, the server 116 may process to display the SERP including all the ranked search results without proceeding to the remainder of steps of the method 200.

For the purposes of the illustrations to be presented herein below, it shall be assumed that the user has entered three separate queries. Naturally, in a real life situation, the user would search one query at a time—so it should be understood that the three queries presented herein below are for illustration purposes only. Also, for the ease of illustration, it shall be assumed that the electronic device 102 is the Apple™ iPad™ executing the search application 104 as a Yandex browser.

Scenario 1.

For this scenario, it is assumed that the user is searching for a Wikepedia article about Brad Pitt and, as such, the user has entered the following query in Russian into the query interface 106: "Бред Питт википедия" (i.e. Brad Pitt Wikepidea).

Scenario 2.

For this scenario, it is assumed that the user is searching for a Twitter of Kseniya Sobchak and, as such, the user has entered the following query in Russian into the query interface 106: "Твиттер Собчак" (i.e. Twitter Sobchak).

Scenario 3.

For this scenario, it is assumed that the user is searching for the official web site of Luzhniki Complex and, as such, the user has entered the following query in Russian into the query interface 106: "Лужники официальный сайт" (i.e. Luzhniki official site).

The method 200 then proceeds to execution of step 204.

Step 204—Determining a Likelihood Parameter Indicative of how Likely the Most Relevant Document is to Satisfy the Search Query The method 200 then proceeds to step 204, where the server 116 determines a likelihood parameter indicative of how likely the most relevant document is to satisfy the search query. As has been previously alluded to, the server 116 executes one or more algorithms to determine if the best document is most responsive to the user query.

Scenario 1.

For this scenario, the ranked search result set includes the top result which is "ru.wikipedia.org/wiki/Питт,_Брэд" with the title "*Питт, Брэд — Википедия*" (i.e. Pitt, Brad—Wikipedia), which is the Russian wikipedia article on Brad Pitt. For the purposes of this illustration, it is assumed that the relevancy differential with this search result is substantially different from the rest of the search results within the ranked search results.

By applying the above referenced algorithms, the server 116 determines the likelihood parameter. For example, the above mentioned analysis of the title and the search query words will reveal an indication of a higher likelihood parameter. Likewise, the analysis of the URL and the search query letters will likewise reveal an indication of a higher likelihood parameter.

Finally, the server 116 accesses an internal database containing statistical information about accesses to various web resources, including the Russian wikipidea article on Brad Pitt to determine its popularity by level of clicks. Based on some or all of these approaches to analysis, the server 116 determines the likelihood parameter associated with the top resource.

Scenario 2.

For this scenario, the ranked search result set includes the top result which is "https://twitter.com/xenia_sobchak" with the title "Ксения Собчак (xenia_sobchak) on Twitter" (i.e. Kseniya Sobchak on Twitter), which is the twitter page of Kseniya Sobchak. For the purposes of this illustration, it is assumed that the relevancy differential with this search result is substantially different from the rest of the search results within the ranked search results.

By applying the above referenced algorithms, the server 116 determines the likelihood parameter. For example, the above mentioned analysis of the title and the search query words will reveal an indication of a higher likelihood parameter. Likewise, the analysis of the URL and the search query letters will likewise reveal an indication of a higher likelihood parameter.

Finally, the server 116 accesses an internal database containing statistical information about accesses to various web resources, including the Twitter page of Kseniya Sobchak to determine its popularity by level of clicks in prior same or similar searches. Based on some or all of these approaches to analysis, the server 116 determines the likelihood parameter associated with the top resource.

Scenario 3.

For this scenario, the ranked search result set includes the top result which is "www.luzhniki.ru/" with the title " Олимпийский комплекс Лужники" (i.e. Luzhniki Olympic Complex), which is the official web site of the Luzhniki Complex. For the purposes of this illustration, it is assumed that the relevancy differential with this search result is substantially different from the rest of the search results within the ranked search results.

By applying the above referenced algorithms, the server 116 determines the likelihood parameter. For example, the above mentioned analysis of the title and the search query words will reveal an indication of a higher likelihood parameter. Likewise, the analysis of the URL and the search query letters will likewise reveal an indication of a higher likelihood parameter.

Finally, the server 116 accesses an internal database containing statistical information about accesses to various web resources, including the Luzhniki official web site to determine its popularity by level of clicks. Based on some or all of these approaches to analysis, the server 116 determines the likelihood parameter associated with the top resource.

Having so-determined the likelihood parameter, the method 200 then proceeds to execution of step 206.

Step 206—in Response to the Likelihood being Above a Threshold, Displaying Exclusively the Most Relevant Document If the determined likelihood parameter is above the predetermined threshold, the server 116 may cause the best document to be exclusively displayed to the user. In other words, if the server 116 determines that the likelihood parameter is above the pre-determined threshold, the user will only see the best document, as the result to his or her search query.

In some embodiments of the present technology, the server 116 marks the best document as the best document (such, as for example, in the meta data fields). Marking of the best document enables the electronic device 102 to be triggered, upon receipt of the search results, to display exclusively the best document by accessing and retrieving the document for the user. In alternative embodiments, the server may retrieve and send the resource associated with the best document and transmit the resource to the user.

Scenario 1.

Figure 3:
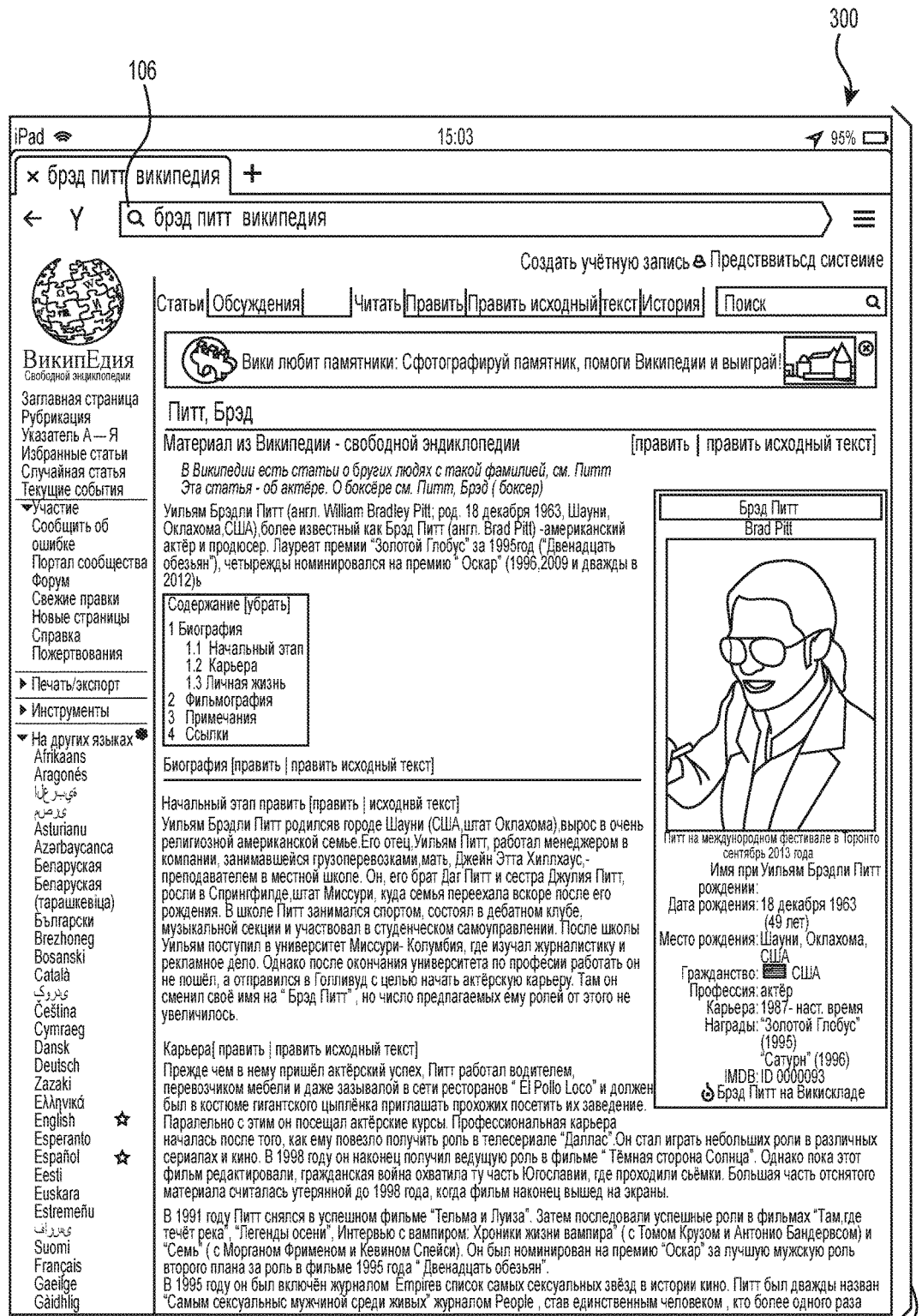
FIG. 3 is a schematical representation of a screenshot 300, the screenshot 300 being one of the outcomes of executing method 200 of FIG. 2.

For this scenario, recalling that the top document was determined to have a likelihood above the pre-determined threshold, the electronic device 102 is caused to retrieve and display exclusively the Russian Wikipedia page on Brad Pitt. A screenshot of a representative display of the best document is displayed with reference to FIG. 3, which shows a screenshot 300.

Scenario 2.

Figure 4:
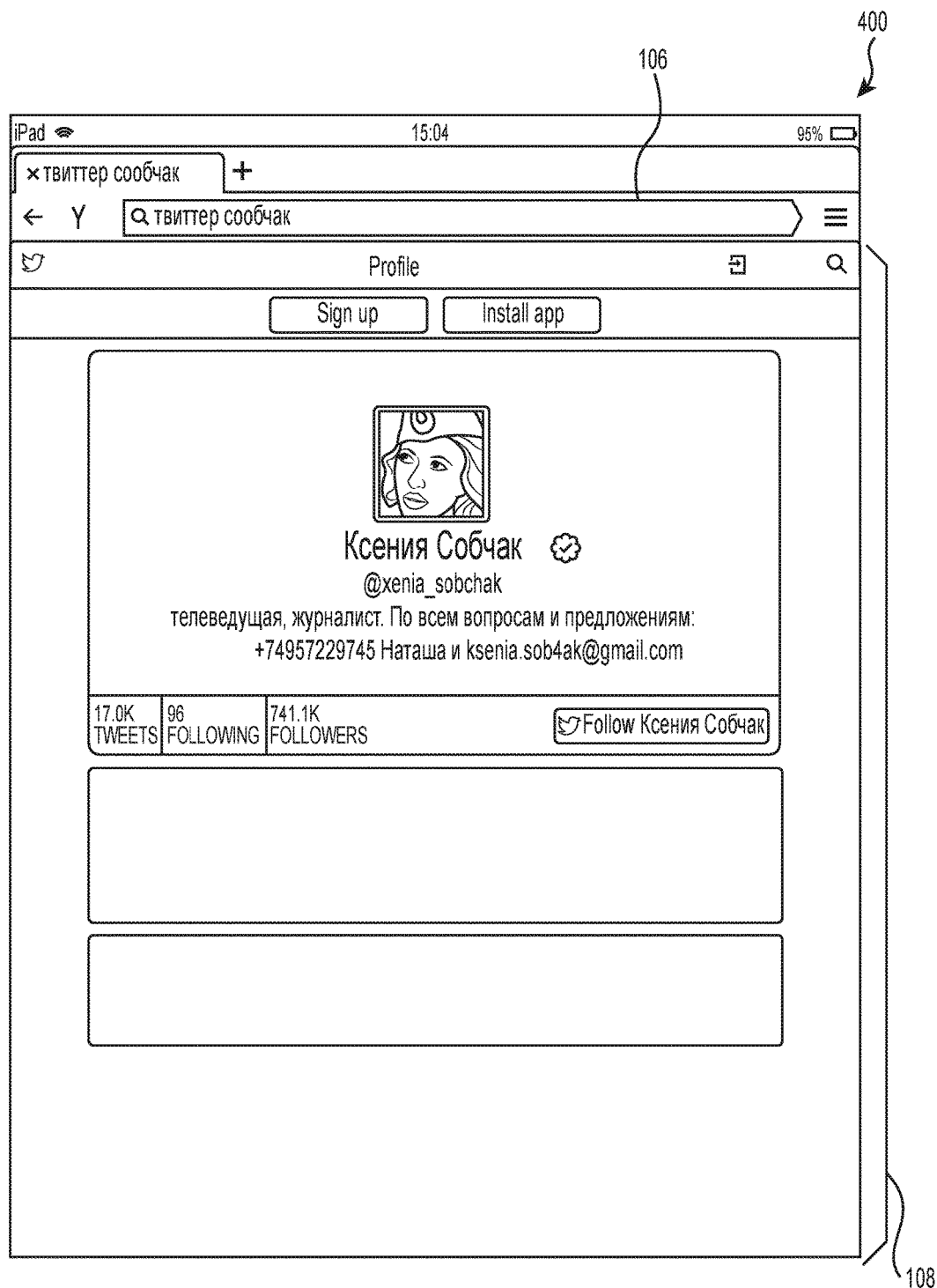
FIG. 4 is a schematical representation of a screenshot 400, the screenshot 400 being one of the outcomes of executing method 200 of FIG. 2.

For this scenario, recalling that the top document was determined to have a likelihood above the pre-determined threshold, the electronic device 102 is caused to retrieve and display exclusively the Twitter page of Kseniya Sobchak. A screenshot of a representative display of the best document is displayed with reference to FIG. 4, which shows a screenshot 400.

Scenario 3.

Figure 5:
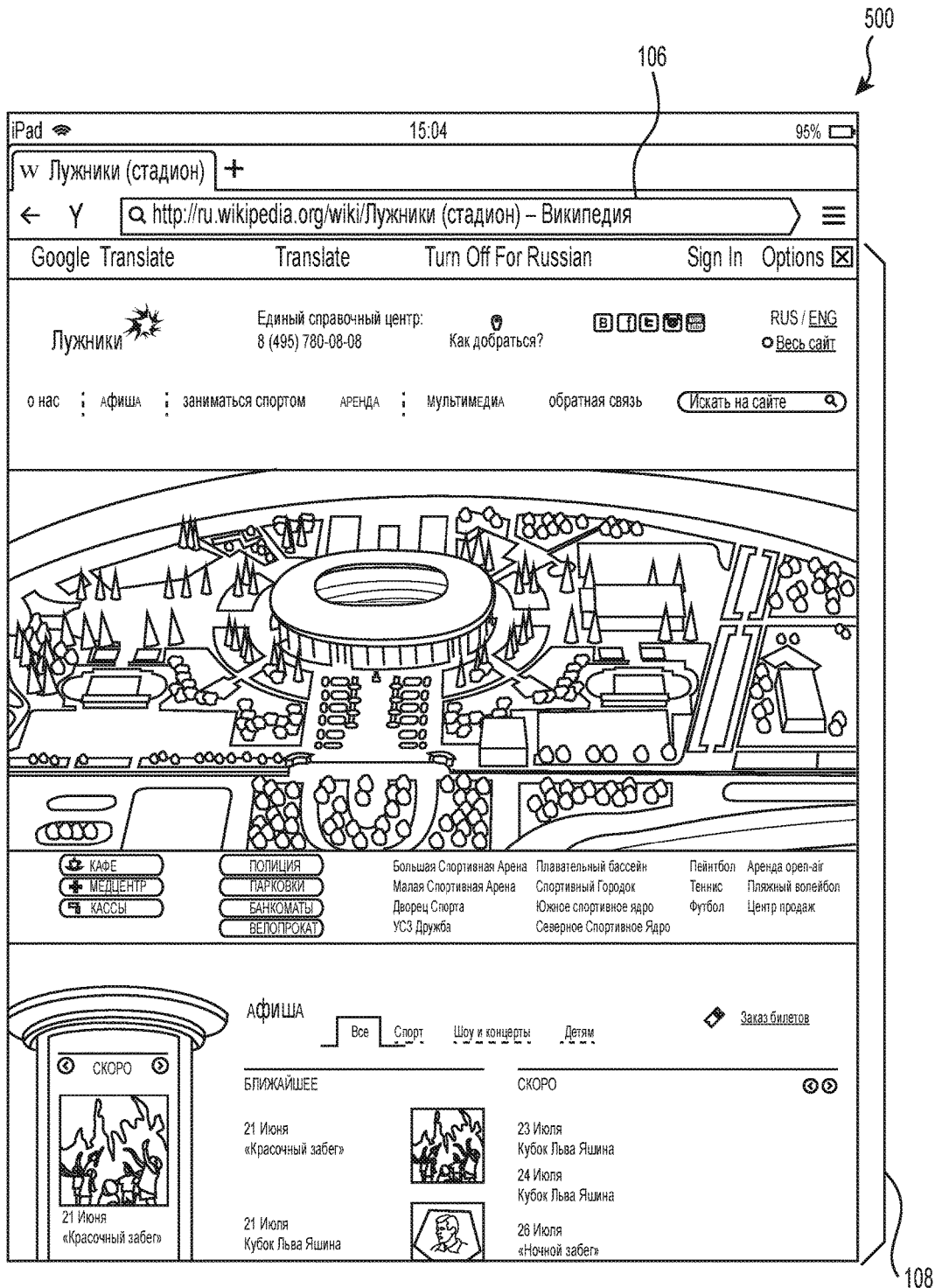
FIG. 5 is a schematical representation of a screenshot 500, the screenshot 500 being one of the outcomes of executing method 200 of FIG. 2.

For this scenario, recalling that the top document was determined to have a likelihood above the pre-determined threshold, the electronic device 102 is caused to retrieve and display exclusively the official web site of the Luzhniki Complex. A screenshot of a representative display of the best document is displayed with reference to FIG. 5, which shows a screenshot 500.

Step 208—in Response to the Likelihood being Below the Threshold, Displaying the General SERP Including the Most Relevant Document and Other Documents If, on the other hand, if it is determined that the likelihood parameter is below the pre-determined threshold, the server 116 causes the electronic device 102 to display the general SERP including the most relevant document and the other documents of the ranked search results set.

Figure 6:
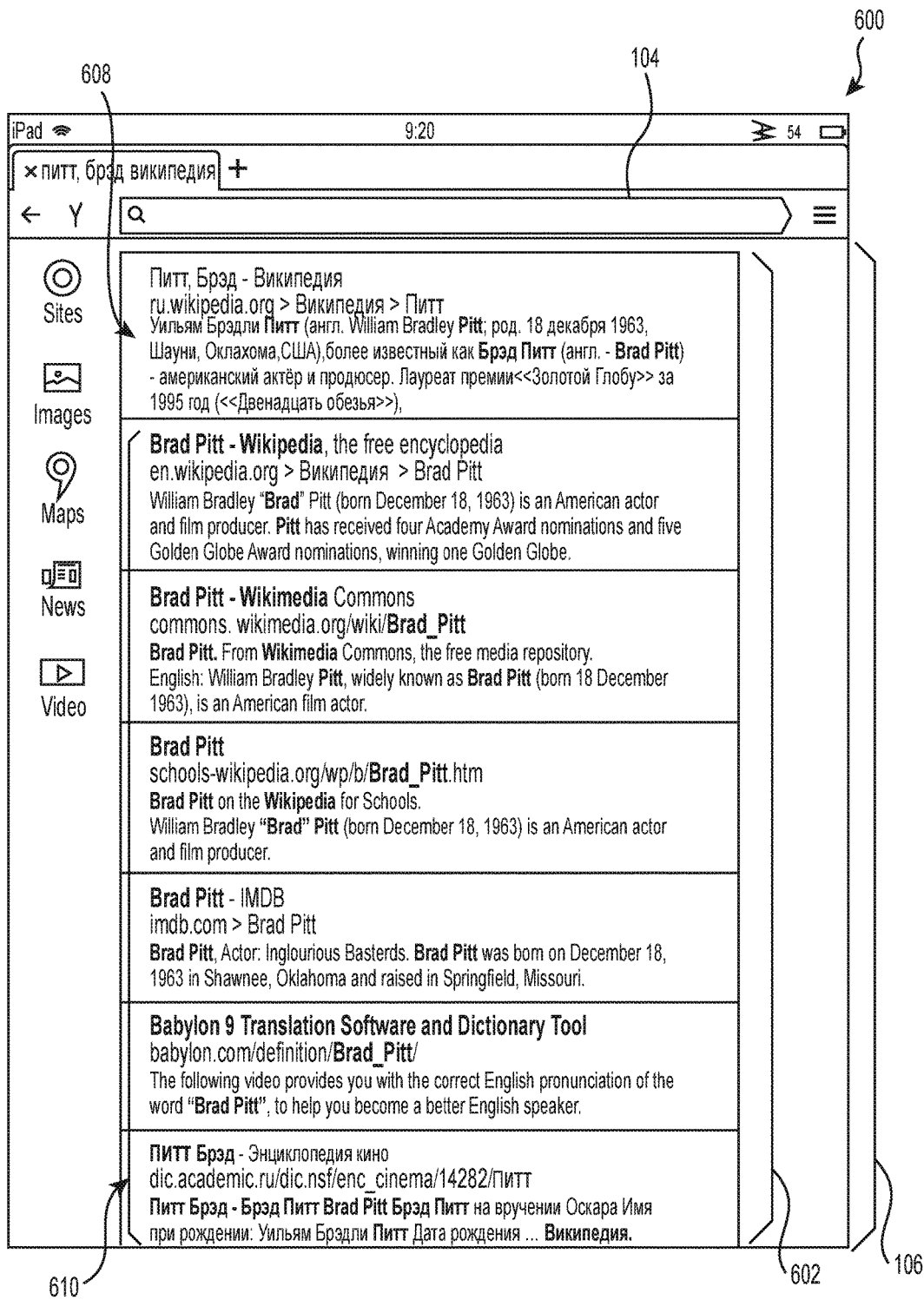
FIG. 6 is a schematical representation of a screenshot 600, the screenshot 600 being one of the outcomes of executing method 200 of FIG. 2.

An example of the general SERP is depicted with reference to FIG. 6, which depicts a screenshot 600 of the general SERP. For the purposes of illustration only, it is assumed that in the above referenced Scenario 1, the likelihood parameter has been determined to be below the pre-determined threshold. Hence, as part of executing step 208, the server 116 transmits the general SERP to the electronic device 102 and the electronic device 102 displays the SERP. As illustrated in FIG. 6 by means of a screenshot 600, the general SERP includes a plurality of search results 602, including a first search result 608 representative of "ru.wikipedia.org/wiki/ Питт,_Брэд " and a sub-set of additional search results 610. For the avoidance of doubt, if the user were to select (i.e. to click or tap) onto the first search result, the user would be taken to the resource and, more specifically, to the screen that looks substantially as the screenshot 300 of FIG. 3.

According to other embodiments of the present technology, there is provided a method for receiving a search response to a search query. The method can be implemented on the electronic device 102 associated with the user. The method starts with a search query being received by the electronic device 102 from the user. How the user can input the search query has been explained at length above. The electronic device then transmits the search query to the server 116 and receives a trigger from the server 116. The trigger is instrumental in causing the electronic device 102 to execute: (i) in response to a likelihood being above a threshold, displaying exclusively the most relevant document; and (ii) in response to the likelihood being below the threshold, displaying the general SERP including the most relevant document and other documents. The trigger has been generated by the server 116 responsive to a receipt of the search query, the server 116 has executed: (i) determining the most relevant document to the search query and (i) determining a likelihood parameter indicative of how likely the most relevant document is to satisfy the search query.

To this extent, the electronic device 102 comprises comprising a non-transient computer usable information storage medium storing computer instructions, which instructions when executed, cause the server to execute the steps described immediately above.

What follows is a description of some of the technical effects of the present technology. It should be expressly noted that these are provided as examples only and should not be construed as a requirement of this technology.

In many circumstances, when accessing a search engine to search the Internet, a user is seeking to solve a problem of sorts. In many of those circumstances, a document that would satisfy the user problem is a single document, be it an on-line movie, a music file, a friend's page in a social network, an official web site of a government department or the like. Within such circumstances, by seeing that one single document, the user's problem would be addressed. Embodiments of the present technology allow striking a balance between selecting that single document and showing that document exclusively and making sure that the single document is indeed the most responsive to the user search query and, therefore, showing exclusively that document would actually address the user's problem.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a search response to a search query associated with a user, the method executable at a server, the server implementing a search engine for determining the search response to the search query, the server accessible by an electronic device associated with the user, the method comprising:
   responsive to a receipt of the search query, ranking search results into ranked search results by assigning a relevancy factor to each of the search results;
   determining a most relevant document from the ranked search results, the most relevant document being a top result within the ranked search results and having a highest relevancy factor within the ranked search results;

determining a relevancy differential between the highest relevancy factor and at least one of the relevancy factor associated with a given search result within the ranked search results;

in response to the relevancy differential being above a predetermined threshold, determining a likelihood parameter indicative of how likely the most relevant document is to exclusively satisfy the search query, the determining the likelihood parameter includes analyzing information associated with the most relevant document;

in response to the likelihood parameter being above a threshold:
  marking the most relevant document for triggering a display of only the most relevant document; and
  transmitting a trigger to the electronic device, the trigger for triggering the access to a URL associated with the most relevant document and the display of only the most relevant document by the electronic device without displaying a general SERP; and in response to the likelihood parameter being below the threshold:
  transmitting an other trigger to the electronic device, the other trigger for triggering a display of the general SERP including the most relevant document and other documents.

2. The method of claim 1, wherein said determining the relevancy differential comprises determining the relevancy differential with a sub set of search results following said top result within said ranked search results.

3. The method of claim 1, wherein the determining the relevancy differential comprises determining the relevancy differential with the top document with a document following the top document in the ranked search result set.

4. The method of claim 1, wherein the co determining the relevancy differential comprises determining the relevancy differential with the top document with an average of a subset of the remainder of the ranked search result set.

5. The method of claim 1, wherein responsive to the relevancy differential being below the pre-determined threshold, the method further comprises automatically triggering the display of the general SERP including the most relevant document and other documents.

6. The method of claim 1, wherein said determining a likelihood parameter comprises analyzing a title field associated with the most relevant document.

7. The method of claim 1, wherein said determining a likelihood parameter comprises analyzing a universal resource locator (URL) associated with the most relevant document.

8. The method of claim 1, wherein said determining a likelihood parameter comprises analyzing a clickability parameter associated with the most relevant document.

9. The method of claim 1, wherein said determining a likelihood parameter comprises executing at least one of:
  analyzing a title field associated with the most relevant document;
  analyzing a universal resource locator (URL) associated with the most relevant document; and
  analyzing a clickability parameter associated with the most relevant document.

10. The method of claim 9, wherein said executing comprises executing all three analyzing steps.

11. A server for determining a search response to a search query associated with a user, the server implementing a search engine for determining the search response to the search query, the server accessible by an electronic device associated with the user, the server comprising a non-transient computer usable information storage medium storing computer instructions, which instructions when executed, cause the server to execute steps of:
  responsive to a receipt of the search query, ranking search results into ranked search results by assigning a relevancy factor to each of the search results;
  determining a most relevant document from the ranked search results, the most relevant document being a top result within the ranked search results and having a highest relevancy factor within the ranked search results;
  determining a relevancy differential between the highest relevancy factor and at least one of the relevancy factor associated with a given search result within the ranked search results;
  in response to the relevancy differential being above a predetermined threshold, determining a likelihood parameter indicative of how likely the most relevant document is to exclusively satisfy the search query, the determining the likelihood parameter includes analyzing information associated with the most relevant document;
  in response to the likelihood parameter being above a threshold:
    marking the most relevant document for triggering a display of only the most relevant document; and
    transmitting a trigger to the electronic device, the trigger for triggering the access to a URL associated with the most relevant document and the display of only the most relevant document by the electronic device without displaying a general SERP; and
  in response to the likelihood parameter being below the threshold:
    transmitting an other trigger to the electronic device, the other trigger for triggering a display of the general SERP including the most relevant document and other documents.

12. An electronic device comprising a non-transient computer usable information storage medium storing computer instructions, which instructions when executed, cause the electronic device to execute steps of:
  receiving a search query from a user and transmitting the search query to a server, via a communication network, the server implementing a search engine for determining a search response to the search query, the server accessible by the electronic device associated with the user;
  receiving from the server a trigger, the trigger having been generated by the server by executing the steps of:
    responsive to a receipt of the search query, ranking search results into ranked search results by assigning a relevancy factor to each of the search results;
    determining by the server a most relevant document from the ranked search results, the most relevant document being a top result within the ranked search results and having a highest relevancy factor within the ranked search results;
    determining by the server a relevancy differential between the highest relevancy factor and at least one of the relevancy factor associated with a given search result within the ranked search results;
    in response to the relevancy differential being above a predetermined threshold, determining by the server a likelihood parameter indicative of how likely the most relevant document is to exclusively satisfy the search query, the determining the likelihood parameter includes analyzing information associated with the most relevant document;

the trigger being instrumental in causing the electronic device:
  in response to the likelihood parameter being above a threshold:
    marking the most relevant document for displaying only the most relevant document; and
    accessing a URL associated with the most relevant document and displaying only the most relevant document without displaying a general SERP; and
  in response to the likelihood parameter being below the threshold:
    displaying the general SERP including the most relevant document and other documents.

* * * * *